(12) United States Patent
Miyamoto (10) Patent No.: US 12,535,900 B2
(45) Date of Patent: Jan. 27, 2026

(54) DRIVING CIRCUIT, ELECTRONIC APPARATUS, AND DRIVING METHOD FOR VIBRATION DEVICE

(71) Applicant: Wacom Co., Ltd., Saitama (JP)

(72) Inventor: Masayuki Miyamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/665,242

(22) Filed: May 15, 2024

(65) Prior Publication Data

US 2025/0036223 A1 Jan. 30, 2025

(30) Foreign Application Priority Data

Jul. 24, 2023 (JP) ................................. 2023-119606

(51) Int. Cl.
*G06F 3/01* (2006.01)
*G06F 3/0354* (2013.01)
*G06F 3/038* (2013.01)

(52) U.S. Cl.
CPC ............ *G06F 3/0383* (2013.01); *G06F 3/016* (2013.01); *G06F 3/03545* (2013.01)

(58) Field of Classification Search
CPC ..... G06F 3/0383; G06F 3/03545; G06F 3/016
See application file for complete search history.

(56) References Cited

U.S. PATENT DOCUMENTS

| | | | |
|---|---|---|---|
| 11,474,609 B1 * | 10/2022 | Demenschonok | G06F 3/011 |
| 11,586,325 B1 * | 2/2023 | Pelissier | G06F 3/162 |
| 2013/0307829 A1 | 11/2013 | Libin | |
| 2018/0183372 A1 * | 6/2018 | Li | G06F 3/016 |
| 2019/0340896 A1 * | 11/2019 | Phan Le | G06F 3/016 |
| 2021/0196513 A1 * | 7/2021 | Govari | A61B 17/320068 |
| 2021/0225139 A1 * | 7/2021 | Sheng | H03K 17/9643 |
| 2021/0281202 A1 * | 9/2021 | Abdelfattah Aly | G06F 3/016 |

* cited by examiner

*Primary Examiner* — Sanghyuk Park
(74) *Attorney, Agent, or Firm* — Seed IP Law Group LLP (57) ABSTRACT

Provided is a driving circuit for driving a vibration device that vibrates according to a driving signal, the driving circuit including a signal generation circuit that, in operation, generates the driving signal so as to have a driving frequency, and transmits the driving signal to the vibration device, a detection circuit that, in operation, detects vibration information related to a vibration of the vibration device from the vibration device, and a control circuit that, in operation, determines the driving frequency of the driving signal based on the vibration information detected by the detection circuit, and transmits information indicating the driving frequency to the signal generation circuit.

10 Claims, 7 Drawing Sheets

DRIVING CIRCUIT, ELECTRONIC APPARATUS, AND DRIVING METHOD FOR VIBRATION DEVICE

BACKGROUND

Technical Field

The present disclosure relates to a driving circuit, an electronic apparatus, and a driving method for a vibration device.

Description of the Related Art

In the past, an electronic apparatus is known which includes a driving circuit for driving a vibration device such as a haptic device and the vibration device.

With regard to this, U.S. Patent Application Publication No. 2013/0307829 discloses an electronic pen that includes a vibration device, and reproduces resistance of various virtual writing surfaces by vibration of the vibration device.

The vibration device has highest efficiency of power consumption when a driving frequency for driving the vibration device coincides with a resonance frequency of the vibration device. However, with a technology described in U.S. Patent Application Publication No. 2013/0307829, the electronic apparatus drives the vibration device by a fixed driving frequency. The efficiency of power consumption is therefore decreased depending on variation in the resonance frequency caused by a manufacturing error, a difference in an environment in which the vibration device is disposed, and the like.

BRIEF SUMMARY

The present disclosure has been made in view of such a problem. Embodiments of the present disclosure provide a driving circuit and an electronic apparatus that can drive a vibration device with high efficiency.

In order to solve the above problems, a driving circuit according to a first aspect of the present disclosure is a driving circuit for driving a vibration device that vibrates according to a driving signal. The driving circuit includes a signal generation circuit that, in operation, generates the driving signal so as to have a driving frequency, and transmits the driving signal to the vibration device, a detection circuit that, in operation, detects vibration information related to a vibration of the vibration device from the vibration device, and a control circuit that, in operation, determines the driving frequency of the driving signal based on the vibration information detected by the detection circuit, and transmits information indicating the driving frequency to the signal generation circuit.

In addition, in the driving circuit according to a second aspect of the present disclosure, the vibration information indicates a vibration frequency at which the vibration device vibrates.

In addition, in the driving circuit according to a third aspect of the present disclosure, the control circuit, in operation, determines the driving frequency such that the driving frequency approaches the vibration frequency.

In addition, in the driving circuit according to a fourth aspect of the present disclosure, the detection circuit, in operation, detects the vibration information from the vibration device after the signal generation circuit stops transmitting the driving signal to the vibration device.

In addition, in the driving circuit according to a fifth aspect of the present disclosure, the vibration information indicates a phase difference between a vibration signal generated according to the vibration of the vibration device and the driving signal.

In addition, in the driving circuit according to a sixth aspect of the present disclosure, the control circuit, in operation, determines the driving frequency such that the phase difference approaches a predetermined value.

In addition, in the driving circuit according to a seventh aspect of the present disclosure, the vibration information indicates an amplitude of a vibration signal generated according to the vibration of the vibration device.

In addition, in the driving circuit according to an eighth aspect of the present disclosure, the control circuit, in operation, determines the driving frequency so as to increase the amplitude.

In addition, an electronic apparatus according to a ninth aspect of the present disclosure includes a vibration device that, in operation, vibrates according to a driving signal, and a driving circuit including a signal generation circuit that, in operation, generates the driving signal so as to have a driving frequency, and transmits the driving signal to the vibration device, a detection circuit that, in operation, detects vibration information related to a vibration of the vibration device from the vibration device, and a control circuit that, in operation, determines the driving frequency of the driving signal based on the vibration information detected by the detection circuit, and transmits information indicating the driving frequency to the signal generation circuit.

In addition, the electronic apparatus according to a tenth aspect of the present disclosure functions as an electronic pen.

In addition, a method for driving a vibration device according to an eleventh aspect of the present disclosure is a driving method for driving a vibration device that vibrates according to a driving signal, the driving method including generating the driving signal so as to have a driving frequency, transmitting the driving signal to the vibration device, detecting vibration information related to a vibration of the vibration device from the vibration device, and determining the driving frequency of the driving signal based on the vibration information.

According to the present disclosure, the driving circuit and the electronic apparatus can drive the vibration device with high efficiency.

DETAILED DESCRIPTION

Embodiments (hereinafter referred to as a "first embodiment" or a "second embodiment") of the present disclosure will hereinafter be described with reference to the accompanying drawings. In order to facilitate understanding of the description, identical constituent elements and acts in respective drawings are identified by the same reference numerals where possible, and repeated description thereof will be omitted.

First Embodiment

Figure 1:
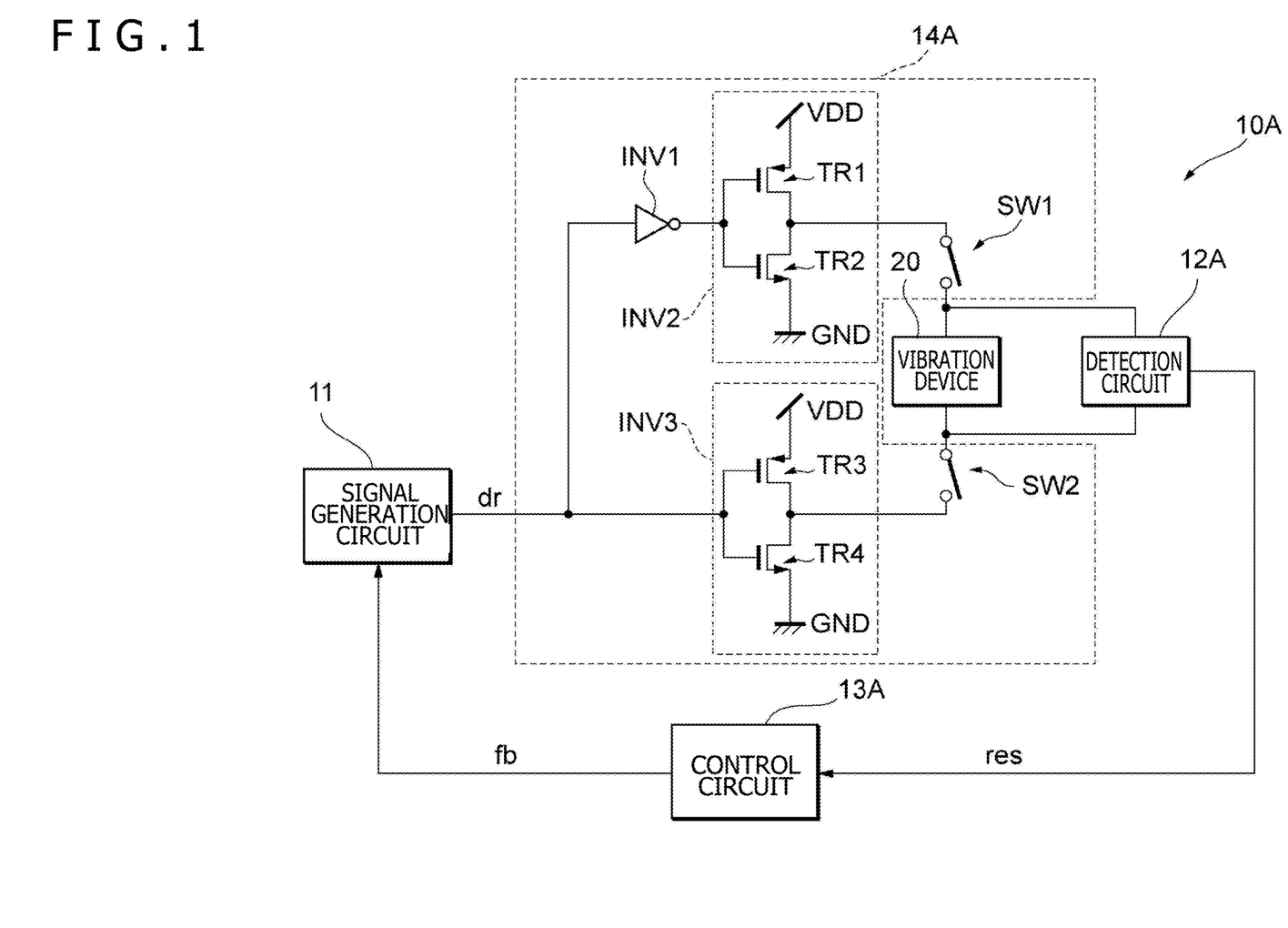
FIG. 1 is a diagram illustrating a first example of a driving circuit.

A first embodiment will first be described.
Configuration
FIG. 1 is a diagram illustrating a first example of a driving circuit. A driving circuit 10A drives a vibration device 20 such as a haptic device. In addition, when the driving circuit 10A drives the vibration device 20, the driving circuit 10A detects vibration information related to the vibration of the vibration device 20 from the vibration device 20, and reflects the content of the detected vibration information in control of the driving of the vibration device 20. The driving circuit 10A includes, for example, a signal generation circuit 11, a detection circuit 12A, a control circuit 13A, and an output circuit 14A. In addition, the driving circuit 10A is, for example, mounted in an electronic apparatus that uses the vibration device 20.

Incidentally, the electronic apparatus mounted with the driving circuit 10A includes, for example, an electronic pen, a user interface device provided to an automobile, a controller of a game apparatus, a mobile telephone, a smart phone, a tablet, a buzzer, a massage machine, a toy having a vibration function, and the like. In addition, the electronic pen mounted with the driving circuit 10A includes, for example, a stylus for a tablet, a pen type device for virtual reality (VR), and the like.

The vibration device 20 is, for example, a haptic device such as a linear resonant actuator (LRA) or an eccentric motor. The vibration device 20 vibrates under driving control of the driving circuit 10A. In a case where short circuit control elements SW1 and SW2 of the output circuit 14A are short-circuited, when a driving signal dr as a signal enhanced via the output circuit 14A is applied across the vibration device 20, the vibration device 20 vibrates according to the application. On the other hand, in a case where the short circuit control elements SW1 and SW2 of the output circuit 14A are opened, the detection circuit 12A detects the vibration information related to the vibration of the vibration device 20 from variations in a potential difference across the vibration device 20 caused by the vibration of the vibration device 20. In addition, the vibration device 20 has one terminal connected to another terminal of the short circuit control element SW1 and one of two input terminals of the detection circuit 12A, and has another terminal connected to one terminal of the short circuit control element SW2 and the other of the two input terminals of the detection circuit 12A.

The signal generation circuit 11 generates the driving signal dr so as to have a driving frequency fdr, and transmits the generated driving signal dr to the vibration device 20. Specifically, the signal generation circuit 11 generates the driving signal dr so as to have the driving frequency fdr indicated by a feedback signal fb transmitted from the control circuit 13A, and transmits the generated driving signal dr to the vibration device 20 via the output circuit 14A. Incidentally, the driving signal dr transmitted from the signal generation circuit 11 is input to logical negation circuits INV1 and INV3 of the output circuit 14A.

The output circuit 14A converts the driving signal dr transmitted from the signal generation circuit 11 into differential signals alternating in opposite phase from each other, further enhances the signals, and then outputs the signals to the vibration device 20. The output circuit 14A includes, for example, logical negation circuits INV1 to INV3 and the short circuit control elements SW1 and SW2.

The logical negation circuits INV1 to INV3 are an inverter circuit including transistors, for example. The logical negation circuit INV1 performs a logical negation operation on the driving signal dr transmitted from the signal generation circuit 11, and outputs the signal resulting from the operation to the logical negation circuit INV2.

The logical negation circuit INV2 performs a logical negation operation on the signal output from the logical negation circuit INV1, and outputs the signal resulting from the operation to the one terminal of the vibration device 20 via the short circuit control element SW1. In addition, the logical negation circuit INV2 includes transistors TR1 and TR2.

The logical negation circuit INV3 performs a logical negation operation on the driving signal dr transmitted from the signal generation circuit 11, and outputs the signal resulting from the operation to the other terminal of the vibration device 20 via the short circuit control element SW2. In addition, the logical negation circuit INV3 includes transistors TR3 and TR4.

The transistors TR1 and TR3 are a P-type metal-oxide-semiconductor field-effect transistor (MOS-FET), for example. The transistors TR1 and TR3 supply potential supplied to a source terminal thereof to a drain terminal thereof or stops the supply according to a signal input to a gate terminal thereof. Specifically, in a case where the state of the signal input to the gate terminal is a low state, the transistors TR1 and TR3 supply the potential supplied to the source terminal to the drain terminal, whereas in a case where the potential of the signal input to the gate terminal is a high state, the transistors TR1 and TR3 stop the supply.

The transistors TR2 and TR4 are an N-type MOS-FET, for example. The transistors TR2 and TR4 extract a charge from a drain terminal thereof to a source terminal thereof or stop the extraction according to a signal input to a gate terminal thereof. Specifically, in a case where the state of the signal input to the gate terminal is a high state, the transistors TR2 and TR4 extract a charge from the drain terminal to the source terminal, whereas in a case where the state of the signal input to the gate terminal is a low state, the transistors TR2 and TR4 stop the extraction.

The transistor TR1 has a gate terminal connected to an output terminal of the logical negation circuit INV1 and a gate terminal of the transistor TR2, has a source terminal supplied with a power supply potential VDD, and has a drain terminal connected to a drain terminal of the transistor TR2 and one terminal of the short circuit control element SW1.

The transistor TR2 has a gate terminal connected to the output terminal of the logical negation circuit INV1, has a source terminal supplied with a ground potential GND, and has a drain terminal connected to the drain terminal of the transistor TR1 and the one terminal of the short circuit control element SW1.

The transistor TR3 has a gate terminal connected to an output terminal of the signal generation circuit 11, an input terminal of the logical negation circuit INV1, and a gate terminal of the transistor TR4, has a source terminal supplied with the power supply potential VDD, and has a drain terminal connected to a drain terminal of the transistor TR4 and another terminal of the short circuit control element SW2.

The transistor TR4 has a gate terminal connected to the output terminal of the signal generation circuit 11, the input terminal of the logical negation circuit INV1, and the gate terminal of the transistor TR3, has a source terminal supplied with the ground potential GND, and has a drain terminal connected to the drain terminal of the transistor TR3 and the other terminal of the short circuit control element SW2.

The short circuit control elements SW1 and SW2 are, for example, a switch element, a transistor, or the like. The short circuit control elements SW1 and SW2 output the driving signal dr as an enhanced signal from the output circuit 14A or stops the output under control of the control circuit 13A. Specifically, the short circuit control element SW1 has one terminal connected to the drain terminals of the transistors TR1 and TR2, while the short circuit control element SW1 has another terminal connected to the one terminal of the vibration device 20 and one of the two input terminals of the detection circuit 12A. The short circuit control element SW1 short-circuits or opens the two terminals thereof under control of the control circuit 13A. In addition, the short circuit control element SW2 has one terminal connected to the other terminal of the vibration device 20 and the other of the two input terminals of the detection circuit 12A, while the short circuit control element SW2 has another terminal connected to the drain terminals of the transistors TR3 and TR4. The short circuit control element SW2 short-circuits or opens the two terminals thereof under control of the control circuit 13A.

The detection circuit 12A detects the vibration information related to the vibration of the vibration device 20 from the vibration device 20. Specifically, after the signal generation circuit 11 stops transmitting the driving signal dr to the vibration device 20, the detection circuit 12A obtains temporal changes in the potential difference across the vibration device 20 as a vibration signal, and detects the frequency, amplitude, and the like of the obtained signal as the vibration information. Incidentally, the frequency of the signal obtained by the detection circuit 12A represents a vibration frequency fres of the vibration device 20. The detection circuit 12A outputs a detection signal res including the detected vibration information to the control circuit 13A.

The control circuit 13A determines the driving frequency fdr on the basis of the vibration information such as the vibration frequency fres and the amplitude detected by the detection circuit 12A, and transmits the determined driving frequency fdr as the feedback signal fb to the signal generation circuit 11. Specifically, the control circuit 13A determines the driving frequency fdr such that the driving frequency fdr approaches the vibration frequency fres. In addition, the control circuit 13A determines the driving frequency fdr such that the amplitude indicated by the vibration information increases. In addition, the control circuit 13A controls the transmission of the driving signal dr and the stopping of the transmission by the signal generation circuit 11, the operations of short-circuiting and opening the short circuit control elements SW1 and SW2, and the detection of the vibration information from the vibration device 20 and the stopping of the detection by the detection circuit 12A.

Figure 6:
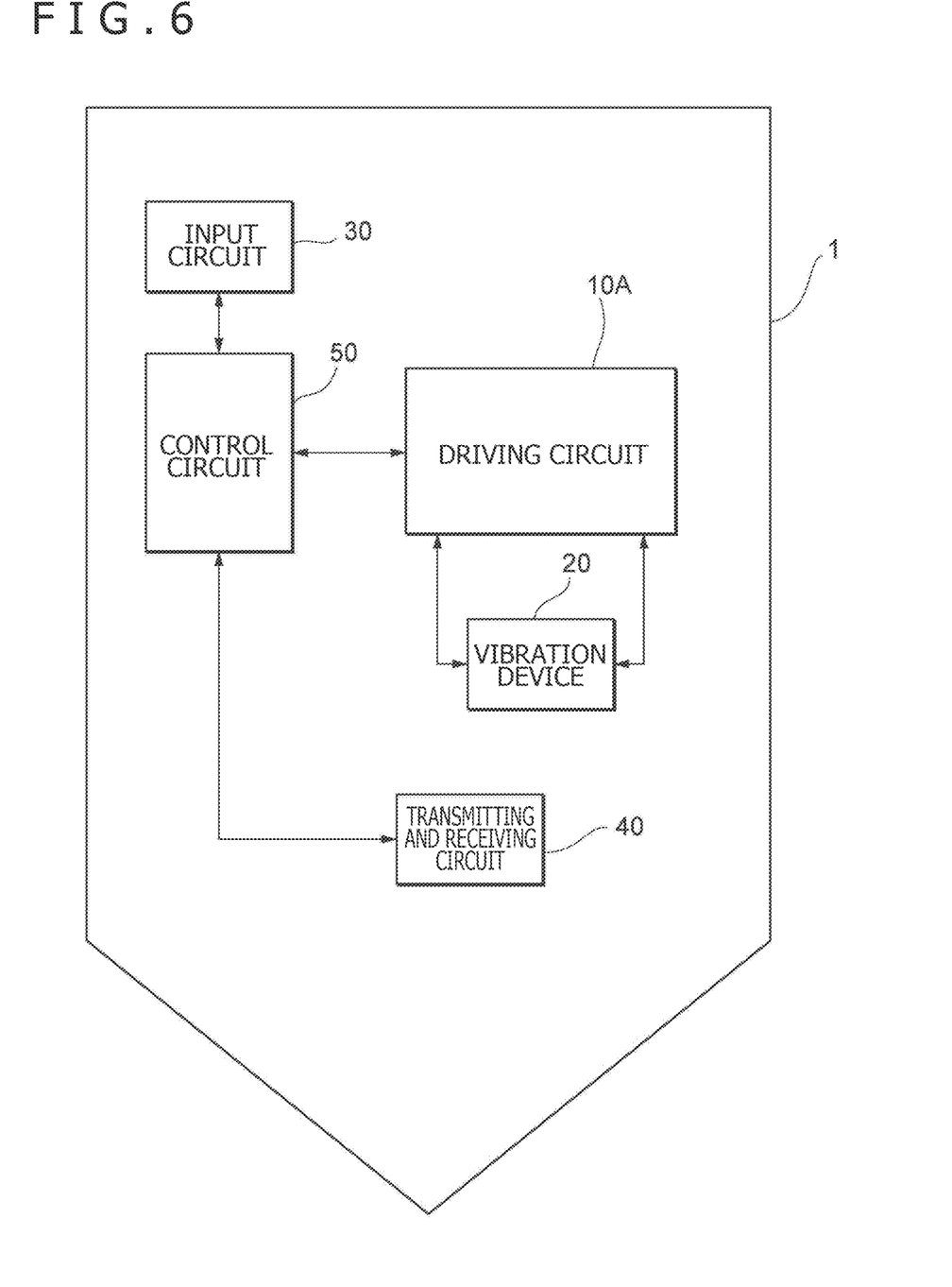
FIG. 6 is a diagram illustrating an example of an electronic apparatus including the driving circuit.

Description will next be made of an example of the electronic apparatus mounted with the driving circuit 10A according to the first embodiment. FIG. 6 is a diagram illustrating an example of an electronic apparatus 1 including the driving circuit 10A. The electronic apparatus 1 illustrated in FIG. 6 is, for example, an electronic pen such as a stylus for a tablet or a pen type device for VR. The electronic apparatus 1 includes, for example, the driving circuit 10A, the vibration device 20, an input circuit 30, a transmitting and receiving circuit 40, and a control circuit 50. The configuration and operation of the driving circuit 10A and the vibration device 20 are as described above, and therefore description thereof will be omitted.

The input circuit 30 is a circuit for converting a received operation into a signal when receiving the operation from an operator of the electronic apparatus 1 via an input interface. The input circuit 30 converts the operation received from the operator into a signal including information related to operation contents, and transmits the converted signal to the control circuit 50.

The transmitting and receiving circuit 40 is a circuit for performing communication between the electronic apparatus 1 and an apparatus other than the electronic apparatus 1. The transmitting and receiving circuit 40, for example, transmits and receives signals for indicating the position of the pen, the level of a pressure applied to the tablet by the pen, and the like to and from the tablet, a VR apparatus, or the like. In addition, the transmitting and receiving circuit 40 receives a signal for transmission from the control circuit 50, and outputs a received signal to the control circuit 50.

The control circuit 50 is a circuit for controlling the operation of the electronic apparatus 1. The control circuit 50 generates a signal for transmission according to a signal transmitted from the input circuit 30 or a signal received from the transmitting and receiving circuit 40, and outputs the generated signal to the transmitting and receiving circuit 40. In addition, the control circuit 50 outputs an instruction related to the vibrating operation of the vibration device 20 to the driving circuit 10A according to a signal transmitted from the input circuit 30 or a signal received from the transmitting and receiving circuit 40. In addition, the control circuit 50 performs various other kinds of control necessary for the electronic apparatus 1 to function as the electronic pen.

The electronic apparatus 1 configured as described above makes the driving circuit 10A perform processing of calibrating the driving frequency fdr such that the driving frequency fdr approaches the vibration frequency fres at a time at which the electronic apparatus 1 is started, a time at which the electronic apparatus 1 is returned from a sleep mode for battery saving or the like, or the like. In addition, after the processing of calibrating the driving frequency fdr is completed, the electronic apparatus 1 performs processing according to an operation by the operator of the electronic apparatus 1, an instruction from another apparatus that mutually performs transmission and reception, and the like.

In addition, in a case where the electronic apparatus 1 functions as the electronic pen, the electronic apparatus 1 drives the driving circuit 10A so as to change a degree of vibration of the vibration device 20 according to a pressure on the tablet when the operator indicates a position by bringing the electronic apparatus 1 into contact with the tablet. Thus, though the electronic apparatus 1 is a digital pen, the electronic apparatus 1 can reproduce a writing feel and a drawing feel as an analog pen.

In addition, in a case where the electronic apparatus 1 functions as a pen for VR, when the operator indicates a position on an imaginary plane positioned in a space by the electronic apparatus 1, the electronic apparatus 1 drives the driving circuit 10A so as to change the degree of vibration of the vibration device 20 according to a moving speed or a moving acceleration with respect to the imaginary plane. Thus, though the electronic apparatus 1 is a pen for VR, the electronic apparatus 1 can reproduce a writing feel and a drawing feel as an analog pen.

Flow of Series of Operations

Figure 2:
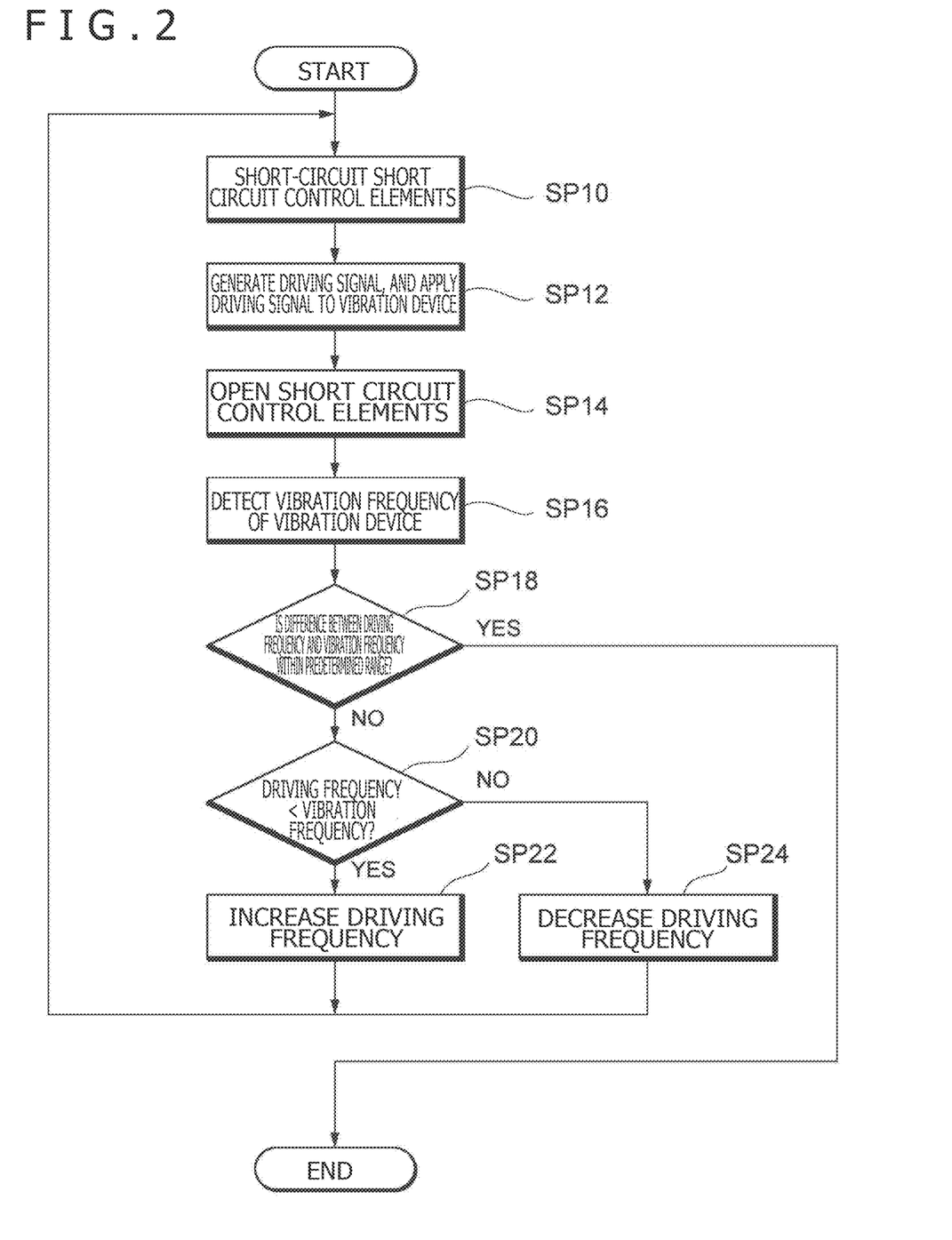
FIG. 2 is a flowchart illustrating a flow of a series of operations of the driving circuit in the first example.

The driving circuit 10A according to the first embodiment, each constituent element of the electronic apparatus 1 and the vibration device 20 have been described above. Next, a flow of a series of operations of the driving circuit 10A according to the first embodiment will be described. FIG. 2 is a flowchart illustrating the flow of the series of operations of the driving circuit 10A in the first example.

SP10

The driving circuit 10A uses the control circuit 13A to control both terminals of the short circuit control element SW1 and both terminals of the short circuit control element SW2 to a short-circuited state. Then, the processing proceeds to the processing of SP12.

SP12

The driving circuit 10A uses the control circuit 13A to make the signal generation circuit 11 generate the driving signal dr and apply the generated driving signal dr to the vibration device 20 via the output circuit 14A for a predetermined period of time or more. Incidentally, the signal generation circuit 11 generates the driving signal dr so as to have the driving frequency fdr that is determined by the control circuit 13A or is an initial value determined in advance. Then, the processing proceeds to the processing of SP14.

SP14

The driving circuit 10A uses the control circuit t 13A to make the generation and application of the driving signal dr by the signal generation circuit 11 stopped. Next, the driving circuit 10A uses the control circuit 13A to control both terminals of the short circuit control element SW1 and both terminals of the short circuit control element SW2 to an opened state. Then, the processing proceeds to the processing of SP16.

SP16

The driving circuit 10A uses the control circuit 13A to make the detection circuit 12A obtain temporal changes in the potential difference across the vibration device 20 as a vibration signal, and detect the frequency of the obtained vibration signal as the vibration frequency fres of the vibration device 20. Then, the processing proceeds to the processing of SP18.

SP18

The driving circuit 10A uses the control circuit 13A to calculate a difference between the driving frequency fdr and the vibration frequency fres, and determine whether or not the calculated difference is within a predetermined range. The predetermined range, for example, may be a range between an upper limit value and a lower limit value determined in advance for the calculated difference, or may be a range of an upper limit value and a lower limit value determined in advance for a ratio of the calculated difference to the driving frequency fdr (for example, ±1% of the driving frequency fdr). Then, when the determination is a negative determination, the driving circuit 10A determines that the driving frequency fdr is inappropriate for the vibration device 20, and the processing proceeds to the processing of SP20. When the determination is a positive determination, on the other hand, the driving circuit 10A determines that the driving frequency fdr is appropriate for the vibration device 20, and the series of processing illustrated in FIG. 2 is ended.

SP20

The driving circuit 10A uses the control circuit 13A to determine whether or not the driving frequency fdr is lower than the vibration frequency fres. Then, when the determination is a positive determination, the processing proceeds to the processing of SP22. When the determination is a negative determination, on the other hand, the processing proceeds to the processing of SP24.

SP22

The driving circuit 10A uses the control circuit 13A to increase the driving frequency fdr from a present value. When the control circuit 13A increases the driving frequency fdr, the control circuit 13A may increase the driving frequency fdr by a predetermined value, may increase the driving frequency fdr by a predetermined ratio, or may increase the driving frequency fdr such that the driving frequency fdr becomes the same value as the value of the vibration frequency fres. Then, the processing returns to the processing of SP10.

SP24

The driving circuit 10A uses the control circuit 13A to decrease the driving frequency fdr from the present value. When the control circuit 13A decreases the driving frequency fdr, the control circuit 13A may decrease the driving frequency fdr by a predetermined value, may decrease the driving frequency fdr by a predetermined ratio, or may decrease the driving frequency fdr such that the driving frequency fdr becomes the same value as the value of the vibration frequency fres. Then, the processing returns to the processing of SP10.

Effects

As described above, in the first embodiment, the driving circuit 10A is the driving circuit 10A for driving the vibration device 20 that vibrates according to the driving signal dr, the driving circuit 10A including the signal generation circuit 11 that generates the driving signal dr so as to have the driving frequency fdr, and transmits the generated driving signal dr to the vibration device 20, the detection circuit 12A that detects the vibration information related to the vibration of the vibration device 20 from the vibration device 20, and the control circuit 13A that determines the driving frequency fdr on the basis of the vibration information detected by the detection circuit 12A, and transmits the determined driving frequency fdr to the signal generation circuit 11.

According to this configuration, the driving circuit 10A determines the driving frequency fdr on the basis of the vibration information of the vibration device 20. The driving circuit 10A can therefore drive the vibration device 20 with high efficiency.

In addition, in the first embodiment, the vibration information is the vibration frequency fres at which the vibration device 20 vibrates.

According to this configuration, the driving circuit 10A determines the driving frequency fdr on the basis of the vibration frequency fres of the vibration device 20. The driving circuit 10A can therefore drive the vibration device 20 with high efficiency.

In addition, in the first embodiment, the control circuit 13A determines the driving frequency fdr such that the driving frequency fdr approaches the vibration frequency fres.

According to this configuration, the driving circuit 10A brings the driving frequency fdr close to the vibration frequency fres of the vibration device 20. The driving circuit 10A can therefore drive the vibration device 20 with high efficiency.

In addition, in the first embodiment, the vibration information is the amplitude of the vibration signal generated according to the vibration of the vibration device 20.

According to this configuration, the driving circuit 10A determines the driving frequency fdr on the basis of the amplitude of the vibration signal. The driving circuit 10A can therefore drive the vibration device 20 with high efficiency.

In addition, in the first embodiment, the control circuit 13A determines the driving frequency fdr so as to increase the amplitude of the vibration signal.

According to this configuration, the driving circuit 10A determines the driving frequency fdr so as to increase the amplitude of the vibration signal. The driving circuit 10A can therefore drive the vibration device 20 with high efficiency.

In addition, in the first embodiment, the electronic apparatus 1 includes the vibration device 20 that vibrates according to the driving signal dr, and the driving circuit 10A including the signal generation circuit 11 that generates the driving signal dr so as to have the driving frequency fdr, and transmits the generated driving signal dr to the vibration device 20, the detection circuit 12A that detects the vibration information related to the vibration of the vibration device 20 from the vibration device 20, and the control circuit 13A that determines the driving frequency fdr on the basis of the vibration information detected by the detection circuit 12A, and transmits the determined driving frequency fdr to the signal generation circuit 11.

According to this configuration, the electronic apparatus 1 determines the driving frequency fdr on the basis of the vibration information of the vibration device 20. The electronic apparatus 1 can therefore drive the vibration device 20 with high efficiency.

In addition, in the first embodiment, the electronic apparatus 1 functions as an electronic pen.

According to this configuration, the electronic apparatus 1 determines the driving frequency fdr on the basis of the vibration information at a time of usage of the electronic pen including the vibration device 20. The electronic apparatus 1 can therefore drive the vibration device 20 of the electronic pen with high efficiency.

In addition, in the first embodiment, a driving method for the vibration device 20 is a driving method for driving the vibration device 20 that vibrates according to the driving signal dr, the driving method including generating the driving signal dr so as to have the driving frequency fdr, transmitting the generated driving signal dr to the vibration device 20, detecting the vibration information related to the vibration of the vibration device 20 from the vibration device 20, and determining the driving frequency fdr on the basis of the detected vibration information.

According to this method, the driving method for the vibration device 20 determines the driving frequency fdr on the basis of the vibration information of the vibration device 20. The driving method can therefore drive the vibration device 20 with high efficiency.

Second Embodiment

Figure 3:
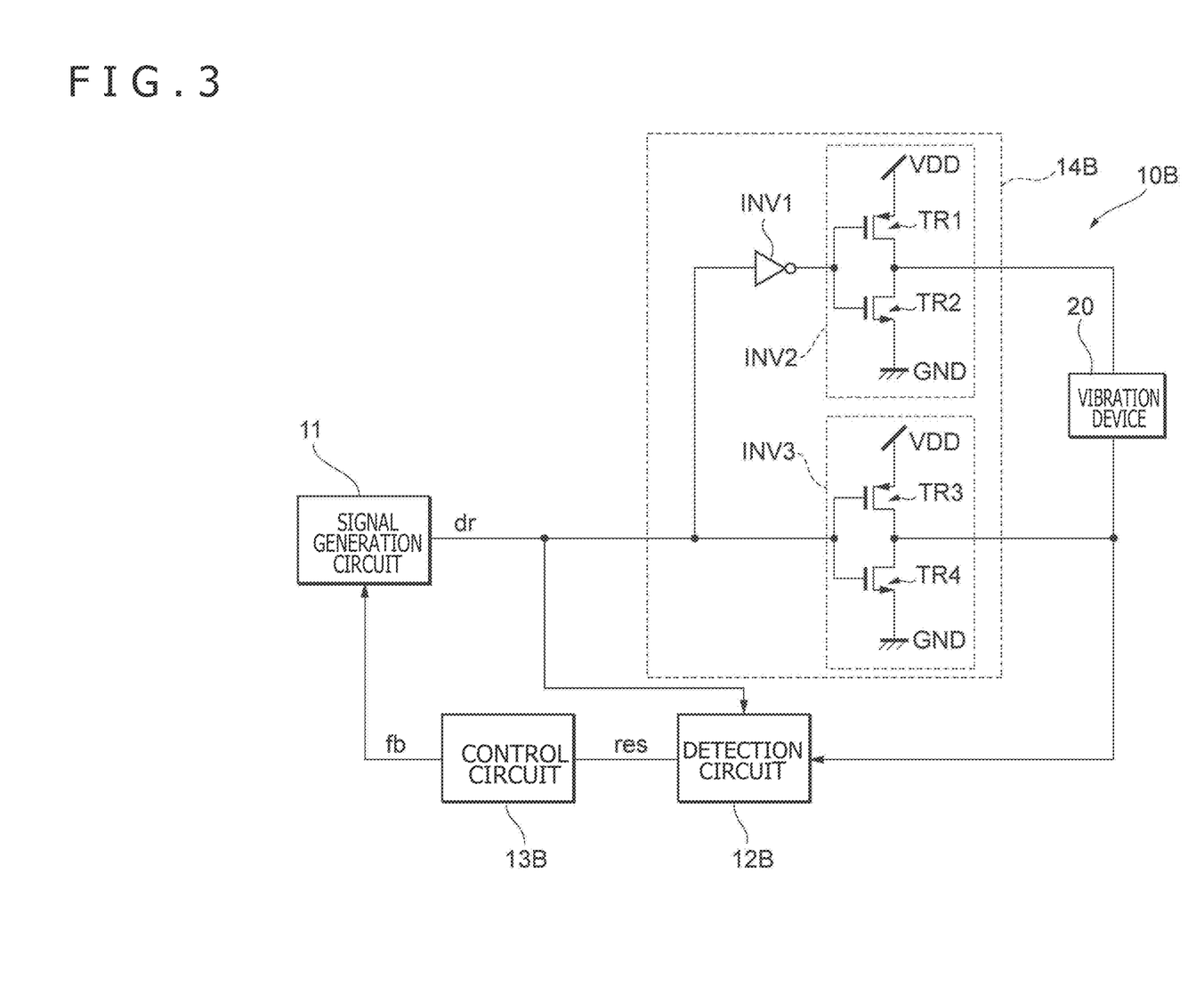
FIG. 3 is a diagram illustrating a second example of the driving circuit.

A second embodiment will next be described.
Configuration
FIG. 3 is a diagram illustrating a second example of the driving circuit. A driving circuit 10B is, for example, formed by providing the driving circuit 10A with an output circuit 14B in place of to the output circuit 14A, providing the driving circuit 10A with a detection circuit 12B in place of the detection circuit 12A, and providing the driving circuit 10A with a control circuit 13B in place of the control circuit 13A. Incidentally, the signal generation circuit 11 is similar to that of the first embodiment except that the signal generation circuit 11 transmits the generated driving signal dr to not only the output circuit 14A but also the detection circuit 12B, and therefore description thereof will be omitted.

The vibration device 20 is similar to that of the first embodiment. The vibration device 20 vibrates under driving control of the driving circuit 10A. When a driving signal dr as a signal enhanced via the output circuit 14B is applied across the vibration device 20, the vibration device 20 vibrates according to the application. In addition, the vibration device 20 has one terminal connected to the drain terminals of the transistors TR1 and TR2 of the output circuit 14B, and has another terminal connected to the drain terminals of the transistors TR3 and TR4 of the output circuit 14B and an input terminal of the detection circuit 12B.

The output circuit 14B is formed by removing the short circuit control elements SW1 and SW2 from the output circuit 14A. The logical negation circuit INV2 in the output circuit 14B performs a logical negation operation on a signal output from the logical negation circuit INV1, and outputs the signal resulting from the operation to the one terminal of the vibration device 20. In addition, the logical negation circuit INV3 in the output circuit 14B performs a logical negation operation on the driving signal dr transmitted from the signal generation circuit 11, and outputs the signal resulting from the operation to the other terminal of the vibration device 20.

The detection circuit 12B detects vibration information related to the vibration of the vibration device 20 from the vibration device 20. Specifically, the detection circuit 12B starts to detect the vibration information of the vibration device 20 on the basis of the driving signal dr having been transmitted from the signal generation circuit 11 to the output circuit 14B and the detection circuit 12B. Here, the detection circuit 12B detects, as the vibration information, a phase difference $\theta$ between the driving signal dr and the vibration signal as temporal changes in the potential of the other terminal of the vibration device 20, the amplitude of the vibration signal, and the like. In addition, the detection circuit 12B outputs a detection signal res including the detected vibration information to the control circuit 13B.

Incidentally, in detecting the phase difference $\theta$ between the driving signal dr and the vibration signal, the detection circuit 12B detects the phase difference $\theta$ by using, for example, a phase locked circuit such as a phase locked loop (PLL). In addition, the detection circuit 12B, for example, measures a time from a rising edge timing of the potential of the driving signal dr to a rising edge timing of the potential of the vibration signal. The detection circuit 12B may calculate the phase difference $\theta$ by dividing the measured time by a cycle of the driving signal dr or the vibration signal, and converting a result of the division into the phase difference.

The control circuit 13A determines a driving frequency fdr on the basis of the vibration information such as the phase difference $\theta$ and the amplitude detected by the detection circuit 12B, and transmits the determined driving frequency fdr to the signal generation circuit 11. Specifically, the control circuit 13B determines the driving frequency fdr such that the absolute value of the phase difference θ approaches a value of π/2, for example. In addition, the control circuit 13B determines the driving frequency fdr so as to increase the amplitude indicated by the vibration information. In addition, the control circuit 13B controls the transmission of the driving signal dr and the stopping of the transmission by the signal generation circuit 11 and the detection of the vibration information from the vibration device 20 and the stopping of the detection by the detection circuit 12B.

Figure 4A:
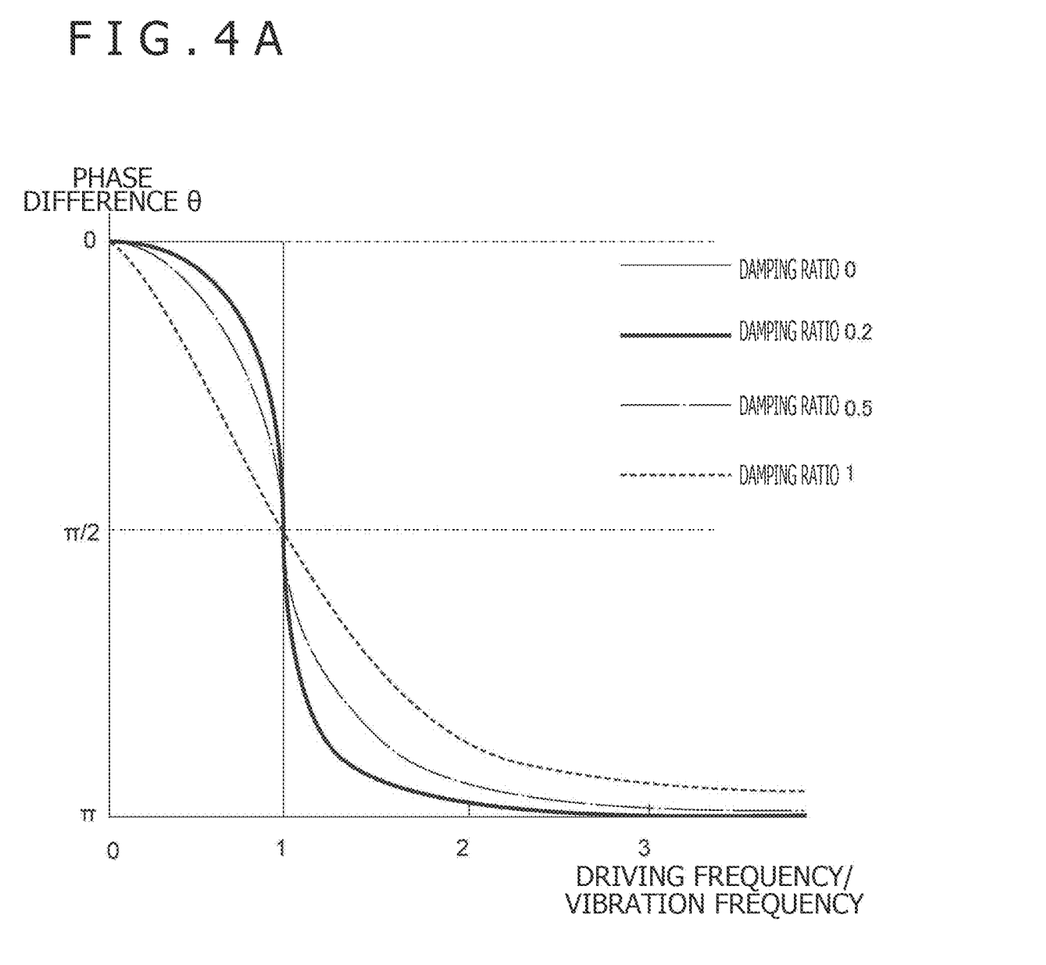
FIG. 4A is a graph illustrating a relation of a ratio between a driving frequency and a vibration frequency to a phase difference when a vibration device is vibrated.
Figure 4B:
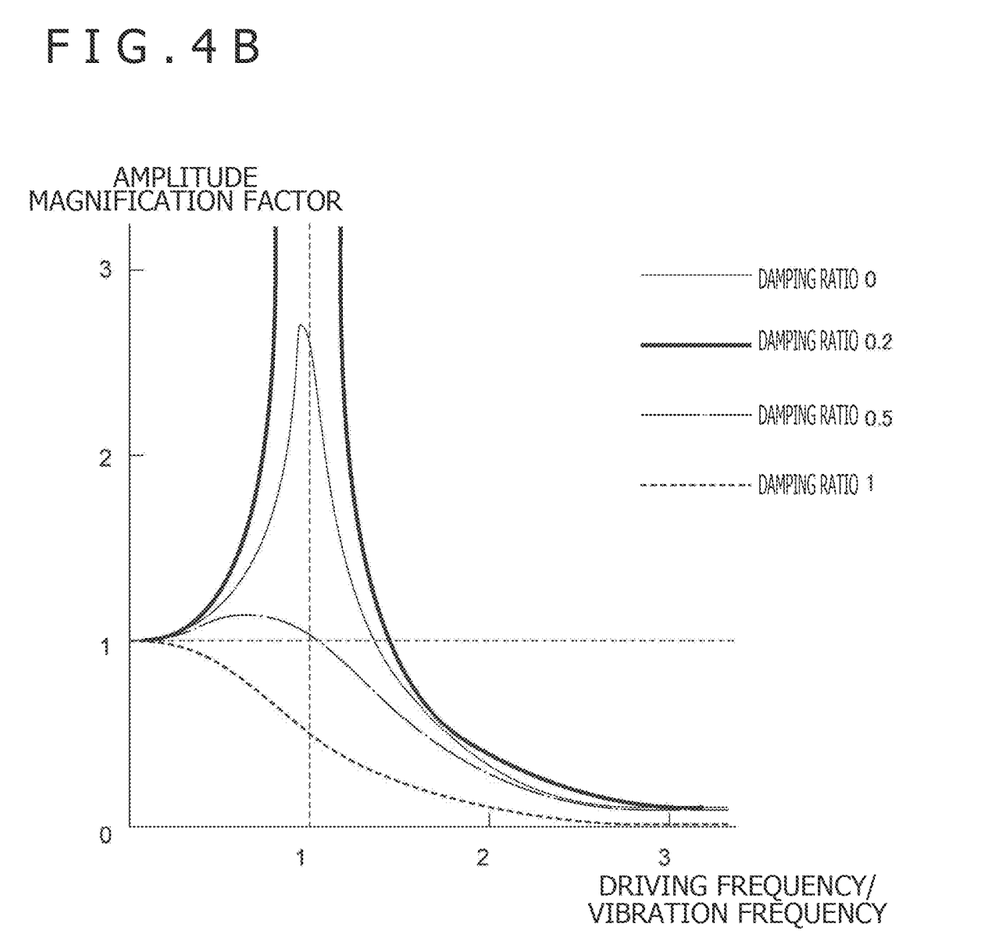
FIG. 4B is a graph illustrating the relation of the ratio between the driving frequency and the vibration frequency to an amplitude magnification factor when the vibration device is vibrated.

Referring to FIG. 4A and FIG. 4B, description will be made of relations of a ratio between the driving frequency fdr and the vibration frequency fres to the phase difference θ and an amplitude magnification factor when the vibration device 20 is vibrated. FIG. 4A is a graph illustrating the relation of the ratio between the driving frequency fdr and the vibration frequency fres to the phase difference θ when the vibration device 20 is vibrated. In addition, FIG. 4B is a graph illustrating the relation of the ratio between the driving frequency fdr and the vibration frequency fres to the amplitude magnification factor when the vibration device 20 is vibrated.

As illustrated in FIG. 4A, the ratio of the driving frequency fdr to the vibration frequency fres is 1.0 when the phase difference θ is the value of π/2 in each of cases where a damping ratio of the vibration of the vibration device 20 is 0, 0.2, 0.5, and 1.0. That is, the driving frequency fdr is substantially equal to the vibration frequency fres when the phase difference θ is the value of π/2.

In addition, as illustrated in FIG. 4B, the amplitude magnification factor increases as the ratio of the driving frequency fdr to the vibration frequency fres approaches 1.0 in each of cases where the damping ratio of the vibration of the vibration device 20 is 0, 0.2, 0.5, and 1.0. Incidentally, the amplitude magnification factor is substantially at a maximum when the driving frequency fdr is slightly higher than the vibration frequency fres.

Flow of Series of Operations

Figure 5:
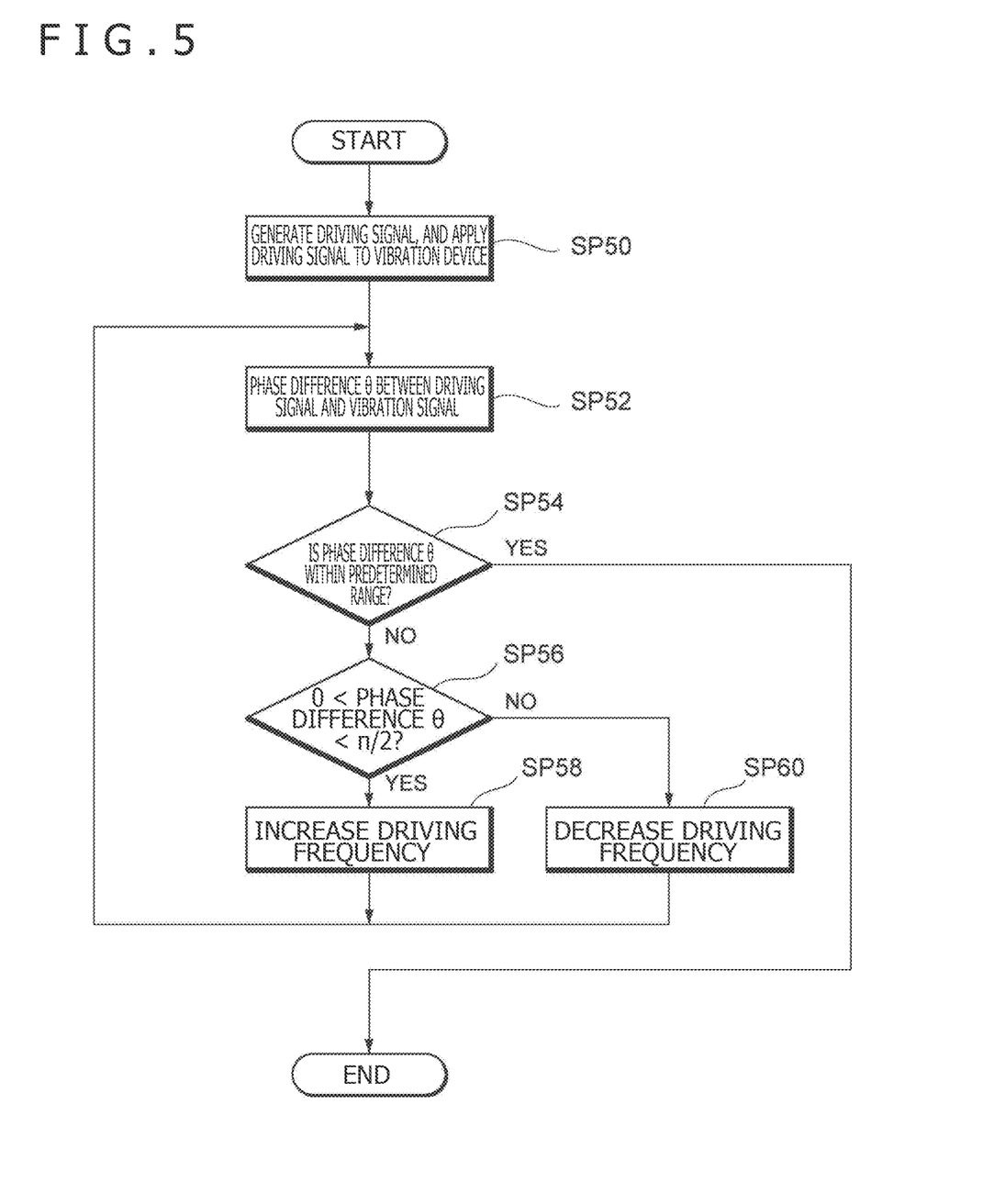
FIG. 5 is a flowchart illustrating a flow of a series of operations of the driving circuit in the second example.

Each constituent element of the driving circuit 10B according to the second embodiment and the vibration device 20 have been described above. Next, a flow of a series of operations of the driving circuit 10B according to the second embodiment will be described. FIG. 5 is a flowchart illustrating the flow of the series of operations of the driving circuit 10B in the second example.

SP50

The driving circuit 10B uses the control circuit 13B to make the signal generation circuit 11 generate the driving signal dr and apply the generated driving signal dr to the vibration device 20 via the output circuit 14B for a predetermined period of time or more. Incidentally, the signal generation circuit 11 generates the driving signal dr so as to have the driving frequency fdr that is determined by the control circuit 13B or is an initial value determined in advance. Then, the processing proceeds to the processing of SP52.

SP52

The driving circuit 10B uses the control circuit 13B to make the detection circuit 12B obtain temporal changes in the potential of the other terminal of the vibration device 20 as a vibration signal, and detect the phase difference θ between the obtained vibration signal and the driving signal dr. Then, the processing proceeds to the processing of SP54.

SP54

The driving circuit 10B uses the control circuit 13B to determine whether or not the phase difference θ is within a predetermined range. The predetermined range is, for example, a range between an upper limit value and a lower limit value determined in advance with π/2 as a reference. The upper limit value and the lower limit value are π/2±1%, for example. Then, when the determination is a negative determination, the driving circuit 10B determines that the driving frequency fdr is inappropriate for the vibration device 20, and the processing proceeds to the processing of SP56. When the determination is a positive determination, on the other hand, the driving circuit 10B determines that the driving frequency fdr is appropriate for the vibration device 20, and the series of processing illustrated in FIG. 5 is ended.

SP56

The driving circuit 10B uses the control circuit 13B to determine whether or not the phase difference θ is a value larger than 0 but smaller than π/2. Then, when the determination is a positive determination, the processing proceeds to the processing of SP58. When the determination is a negative determination, on the other hand, the processing proceeds to the processing of SP60.

SP58

The driving circuit 10B uses the control circuit 13B to increase the driving frequency fdr from a present value. When the control circuit 13B increases the driving frequency fdr, the control circuit 13B may increase the driving frequency fdr by a predetermined value, or may increase the driving frequency fdr by a predetermined ratio. Then, the processing returns to the processing of SP52.

SP60

The driving circuit 10B uses the control circuit 13B to decrease the driving frequency fdr from the present value. When the control circuit 13B decreases the driving frequency fdr, the control circuit 13B may decrease the driving frequency fdr by a predetermined value, or may decrease the driving frequency fdr by a predetermined ratio. Then, the processing returns to the processing of SP52.

Effects

As described above, in the second embodiment, the vibration information is the phase difference θ between the vibration signal generated according to the vibration of the vibration device 20 and the driving signal dr.

According to this configuration, the driving circuit 10B determines the driving frequency fdr on the basis of the phase difference θ between the vibration signal and the driving signal dr. The driving circuit 10B can therefore drive the vibration device 20 with high efficiency. In addition, the driving frequency fdr can be determined while the driving signal dr remains applied.

In addition, in the second embodiment, the control circuit 13B determines the driving frequency fdr such that the phase difference θ approaches a predetermined value (π/2, for example).

According to this configuration, the driving circuit 10B determines the driving frequency fdr such that the phase difference θ approaches a predetermined value. The driving circuit 10B can therefore drive the vibration device 20 with high efficiency. In addition, the driving frequency fdr can be determined while the driving signal dr remains applied.

In addition, in the second embodiment, the vibration information is the amplitude of the vibration signal generated according to the vibration of the vibration device 20.

According to this configuration, the driving circuit 10B determines the driving frequency fdr on the basis of the amplitude of the vibration signal. The driving circuit 10B can therefore drive the vibration device 20 with high efficiency. In addition, the driving frequency fdr can be determined while the driving signal dr remains applied.

In addition, in the second embodiment, the control circuit 13B determines the driving frequency fdr so as to increase the amplitude of the vibration signal.

According to this configuration, the driving circuit 10B determines the driving frequency fdr so as to increase the amplitude of the vibration signal. The driving circuit 10B can therefore drive the vibration device 20 with high efficiency. In addition, the driving frequency fdr can be determined while the driving signal dr remains applied.

Modifications

It is to be noted that the present disclosure is not limited to the foregoing embodiments. That is, the foregoing embodiments modified in design by those skilled in the art as appropriate are also included in the scope of the present disclosure as long as the modified embodiments have features of the present disclosure. In addition, elements included in the foregoing embodiments and modifications to be described later can be combined with one another where technically possible. Combinations of these elements are also included in the scope of the present disclosure as long as the combinations include features of the present disclosure.

For example, in the first embodiment, the detection circuit 12A obtains temporal changes in the potential difference across the vibration device 20 as a vibration signal. However, the present disclosure is not limited to this configuration. The detection circuit 12A may obtain temporal changes in the potential of one of the two terminals of the vibration device 20 as a vibration signal.

According to this configuration, the driving circuit 10A refers to the potential of one of the two terminals of the vibration device 20. The driving circuit 10A therefore makes it possible to reduce parts for the processing of the differential signal and the like, and can drive the vibration device 20 at low cost and with high efficiency.

In addition, in the second embodiment, the detection circuit 12B obtains temporal changes in the potential of the other terminal of the vibration device 20 as a vibration signal. However, the present disclosure is not limited to this configuration. The detection circuit 12B may obtain temporal changes in the potential difference across the vibration device 20 as a vibration signal.

According to this configuration, the driving circuit 10A refers to the potential difference across the vibration device 20. The driving circuit 10A can therefore drive the vibration device 20 with high accuracy and with high efficiency.

In addition, in the first embodiment, the electronic apparatus 1 increases or decreases the driving frequency fdr in the processing of calibrating the driving frequency fdr such that the driving frequency fdr approaches the vibration frequency fres. However, the present disclosure is not limited to this configuration. The electronic apparatus 1 may increase or decrease the driving frequency fdr such that the driving frequency fdr approaches the vibration frequency fres also in a phase of receiving an operation by the operator or an instruction from another electronic apparatus after performing the processing of calibrating the driving frequency fdr in timing in which the electronic apparatus 1 is started or in timing in which the electronic apparatus 1 is released from the sleep mode.

Specifically, the electronic apparatus 1 uses the driving circuit 10A to control the short circuit control elements SW1 and SW2 to a short-circuited state. Next, the electronic apparatus 1 uses the driving circuit 10A to obtain temporal changes in the potential difference across the vibration device 20 as a vibration signal, detects the amplitude of the obtained vibration signal, and stores the amplitude. The electronic apparatus 1 refers to previous changes in the difference of the calculated amplitude and a history of increases and decreases in the driving frequency fdr.

The electronic apparatus 1 uses the driving circuit 10A to determine whether or not the amplitude obtained this time is increased with respect to the amplitude obtained last time. When the electronic apparatus 1 determines by the driving circuit 10A that the determination is a positive determination, the electronic apparatus 1 similarly increases the driving frequency fdr in a case where the electronic apparatus 1 increased the driving frequency fdr last time, or the electronic apparatus 1 similarly decreases the driving frequency fdr in a case where the electronic apparatus 1 decreased the driving frequency fdr last time. On the other hand, when the electronic apparatus 1 determines by the driving circuit 10A that the determination is a negative determination, the electronic apparatus 1 decreases the driving frequency fdr in a case where the electronic apparatus 1 increased the driving frequency fdr last time, or the electronic apparatus 1 increases the driving frequency fdr in a case where the electronic apparatus 1 decreased the driving frequency fdr last time. Incidentally, the electronic apparatus 1 may increase or decrease the driving frequency fdr by a predetermined value in order to check changes in the amplitude of the potential difference across the vibration device 20 immediately after starting the phase of receiving an operation by the operator or an instruction from another electronic apparatus.

According to this configuration, the electronic apparatus 1 determines the driving frequency fdr such that the driving frequency fdr approaches the vibration frequency fres also in the phase in which the electronic apparatus 1 is operated by the operator. The electronic apparatus 1 can therefore drive the vibration device 20 with high efficiency even while being operated by the operator.

In addition, the electronic apparatus 1 mounted with the driving circuit 10A according to the first embodiment increases or decreases the driving frequency fdr such that the driving frequency fdr approaches the vibration frequency fres in the phase of receiving an operation by the operator or an instruction from another electronic apparatus after performing the processing of calibrating the driving frequency fdr in timing in which the electronic apparatus 1 is started or in timing in which the electronic apparatus 1 is released from the sleep mode. However, similar processing may be performed also in the case where the electronic apparatus 1 is mounted with the driving circuit 10B according to the second embodiment. Incidentally, the electronic apparatus 1 mounted with the driving circuit 10B performs processing similar to that of the electronic apparatus 1 mounted with the driving circuit 10A except for the control of short-circuiting and opening the short circuit control elements SW1 and SW2. Thus, description thereof will be omitted.

According to this configuration, the electronic apparatus 1 determines the driving frequency fdr such that the driving frequency fdr approaches the vibration frequency fres also in the phase in which the electronic apparatus 1 is operated by the operator. The electronic apparatus 1 can therefore drive the vibration device 20 with high efficiency even while being operated by the operator.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driving circuit for driving a vibration device that vibrates according to a driving signal, the driving circuit comprising:
   a signal generation circuit that, in operation, generates the driving signal so as to have a driving frequency;
   an output circuit that, in operation, converts the driving signal into a first differential signal having a first phase and a second differential signal having a second phase opposite the first phase, outputs the first differential signal to a first terminal of the vibration device, and outputs the second differential signal to a second terminal of the vibration device that is different from the first terminal;
   a detection circuit that, in operation, detects vibration information related to a vibration of the vibration device from the vibration device, wherein the vibration information indicates a phase difference between a vibration signal generated according to the vibration of the vibration device and the driving signal; and
   a control circuit that, in operation, determines the driving frequency of the driving signal based on the vibration information detected by the detection circuit, and transmits information indicating the driving frequency to the signal generation circuit.

2. The driving circuit according to claim 1, wherein the vibration information indicates a vibration frequency at which the vibration device vibrates.

3. The driving circuit according to claim 2, wherein the control circuit, in operation, determines the driving frequency such that the driving frequency approaches the vibration frequency.

4. The driving circuit according to claim 1, wherein the detection circuit, in operation, detects the vibration information from the vibration device after the signal generation circuit stops transmitting the driving signal to the vibration device.

5. The driving circuit according to claim 1, wherein the control circuit, in operation, determines the driving frequency such that the phase difference approaches a predetermined value.

6. The driving circuit according to claim 1, wherein the vibration information indicates an amplitude of a vibration signal generated according to the vibration of the vibration device.

7. The driving circuit according to claim 6, wherein the control circuit, in operation, determines the driving frequency so as to increase the amplitude.

8. An electronic apparatus comprising:
   a vibration device that, in operation, vibrates according to a driving signal; and
   a driving circuit including:
      a signal generation circuit that, in operation, generates the driving signal so as to have a driving frequency,
      an output circuit that, in operation, converts the driving signal into a first differential signal having a first phase and a second differential signal having a second phase opposite the first phase, outputs the first differential signal to a first terminal of the vibration device, and outputs the second differential signal to a second terminal of the vibration device that is different from the first terminal,
      a detection circuit that, in operation, detects vibration information related to a vibration of the vibration device from the vibration device, wherein the vibration information indicates a phase difference between a vibration signal generated according to the vibration of the vibration device and the driving signal, and
      a control circuit that, in operation, determines the driving frequency of the driving signal based on the vibration information detected by the detection circuit, and transmits information indicating the driving frequency to the signal generation circuit.

9. The electronic apparatus according to claim 8, wherein the electronic apparatus functions as an electronic pen.

10. A method for driving a vibration device that vibrates according to a driving signal, the method comprising:
   generating the driving signal so as to have a driving frequency;
   converting the driving signal into a first differential signal having a first phase and a second differential signal having a second phase opposite the first phase;
   outputting the first differential signal to a first terminal of the vibration device;
   outputting the second differential signal to a second terminal of the vibration device that is different from the first terminal;
   detecting vibration information related to a vibration of the vibration device from the vibration device, wherein the vibration information indicates a phase difference between a vibration signal generated according to the vibration of the vibration device and the driving signal; and
   determining the driving frequency of the driving signal based on the vibration information.

* * * * *